United States Patent
Houk

Patent Number: 5,888,557
Date of Patent: Mar. 30, 1999

[54] FLEXIBLE LOCKING GATE FOR AN EXTRUDER

[75] Inventor: Kurt G. Houk, Stow, Ohio

[73] Assignee: Akron Extruders, Inc., Akron, Ohio

[21] Appl. No.: 12,420

[22] Filed: Jan. 23, 1998

[51] Int. Cl.⁶ .................................................. B29C 47/08
[52] U.S. Cl. .......................... 425/186; 264/39; 425/188; 425/190; 425/192 R
[58] Field of Search .................................. 425/72.1, 185, 425/188, 190, 192 R, 183, 382.3, 382.4, 186; 264/39

[56] References Cited

U.S. PATENT DOCUMENTS

| | | | |
|---|---|---|---|
| 2,057,043 | 10/1936 | Meehan | 146/174 |
| 2,673,102 | 3/1954 | Hutchinson | 285/129 |
| 3,488,807 | 1/1970 | Vossen | 425/192 R |
| 3,544,138 | 12/1970 | Von Eiff | 285/336 |
| 3,605,190 | 9/1971 | Christy | 425/192 R |
| 3,632,279 | 1/1972 | Christy et al. | 425/450 |
| 4,036,258 | 7/1977 | Wolters et al. | 137/614.04 |
| 4,124,346 | 11/1978 | Greenwood et al. | 425/188 |
| 4,137,027 | 1/1979 | Ruger | 425/133.5 |
| 4,341,406 | 7/1982 | Abbes et al. | 285/408 |
| 4,354,522 | 10/1982 | Bormioli | 137/614.02 |
| 4,515,182 | 5/1985 | LeDevehat | 137/614.06 |
| 4,840,554 | 6/1989 | Hirschkorn | 425/190 |
| 5,332,380 | 7/1994 | Unland | 425/135 |
| 5,472,332 | 12/1995 | Gohlisch et al. | 425/186 |

*Primary Examiner*—Patrick Ryan
*Assistant Examiner*—Joseph Leyson
*Attorney, Agent, or Firm*—Reese Taylor

[57] ABSTRACT

An apparatus for evenly distributing forces around a die mounted to an extruder barrel includes a barrel flange mounted around the extruder barrel, the barrel flange providing a flange sealing face and a first angular cam surface, and a die adapter for carrying the die, the die adapter providing an adapter sealing face that opposes the flange sealing face, and a second angular cam surface. The apparatus further includes a pair of opposed clamshells each with a semi-circle opening and a lock channel facing each other, each lock channel having angled cam surfaces facing the first and second angular cam surfaces. A locking mechanism is provided at one end of each pair of opposed clamshells, and a spring-biased link mechanism at the other end of each pair of opposed clamshells, whereby the locking mechanism applies a closure force to at least engage the angled cam surfaces against first and second angular cam surfaces, and the spring-biased link mechanism permits the cam surfaces to bring the sealing faces into sealing contact. The apparatus also provides a counterbalanced spring to bias the lower clamshell.

12 Claims, 3 Drawing Sheets

FLEXIBLE LOCKING GATE FOR AN EXTRUDER

RELATED PATENT APPLICATIONS

None.

FIELD OF THE INVENTION

This invention relates in general to extruder heads and in particular to a clamp ring which has opposed, self-centering clamshells connected by a link mechanism and wherein the link mechanism is biased upon a cantilevered pin.

BACKGROUND OF THE INVENTION

Generally, it is known that various size dies may be interchangeably connected to the head of an extruder barrel. These dies are utilized to manufacture various types of extruded polymeric parts. When it is desired to make a different part, a clamping mechanism is uncoupled to release the die, a new die is installed and the clamping mechanism is re-engaged. An example of a clamping device for an extruder head is disclosed in Christy et al. U.S. Pat. No. 3,632,279 which shows the overall arrangement of two semi-circular, double-pivoted clamps for an extruder die with the clamp section pivotally secured to the die head and wherein a die holder is pivoted to the extruder cylinder.

Other clamping devices, as seen in Meehan U.S. Pat. No. 2,057,043 and Hutchinson U.S. Pat. No. 2,673,102, show two 180° clamp portions with double pivots.

Yet another series of clamping devices, as seen in Abbes et al. U.S. Pat. No. 4,341,406 and Bormioli U.S. Pat. No. 4,354,522, disclose a plurality of flange-clamping links that are double pivoted to intermediate connectors.

Other configurations of clamping devices are shown in LeDevehat U.S. Pat. No. 4,515,182 and Wolters et al. U.S. Pat. No. 4,036,258. The LeDevehat patent shows a three-piece pivoted clamping collar for camming tapered flanges wherein one of the clamp portions is pivotally secured to a frame member. The patent to Wolters discloses pivot pins that are pivoted to a frame member.

Although the above-disclosed devices are suitable for securing a die to an extruder head, it will be appreciated that each has inherent drawbacks. Typically, the disclosed devices may not compensate for poor dimensional stability in the mating parts. As a result, inadequate pressure may be maintained in the extruder head which results in a less than desirable extruded part. In other words, inadequate pressure in the extruder head may even require compensation in other processing variables by adjusting heat zones, the speed of the extruder screw, and the like to ensure an acceptable extruded part.

Still another problem with the disclosed dispensing devices is that if an inadequate seal is created between the die and the extruder barrel polymeric material may leak and interfere with the extrusion process. It will also be appreciated that a leaky connection between a die and an extruder barrel causes a mess and produces excess scrap material.

Therefore, it has become apparent that it is desirable to provide a locking gate for an extruder which applies a uniform or evenly distributed sealing force around the die when it is connected to the extruder barrel. It is also desirable that the locking gate provide a biasing force to one of the clamshells to control its range of motion.

SUMMARY OF THE INVENTION

It has been found, therefore, that a flexible locking gate for an extruder can be constructed which provides a spring-biased link between opposed clamshells. In particular, the gate provides clamshells which connect a die to an extruder head such that the spring-biased link mechanism uniformly distributes sealing forces to ensure a tight seal between the die and the extruder head. Moreover, the flexible locking gate can incorporate a torsional spring between the spring-biased link and one of the clamshells to control its motion when released from the other clamshell.

Specifically, it has been found that a spring pin may be cantilevered from a plate carried by the extruder head. In particular, the spring pin provides two radial grooves and a spring at least axially received upon the grooves. Further, two links with corresponding holes are received upon the spring and the pin and aligned with the radial grooves. It has been found that when the opposed clamshells are closed, the two links are biased and allow slight positional adjustment of the clamshells over the die and the extruder head during closure thereof.

It has also been found that a torsional spring may be provided between the two links and the lower clamshell. In particular, the torsional spring biases the lower clamshell as it opens to preclude it from damaging itself or hurting the operator.

Accordingly, application of a uniform seal around the extruder barrel and the die becomes the principal object of this invention with other objects thereof becoming more apparent upon a reading of the following brief specification considered and interpreted in view of the accompanying drawings.

BRIEF DESCRIPTION OF THE PREFERRED EMBODIMENTS

Figure 1:
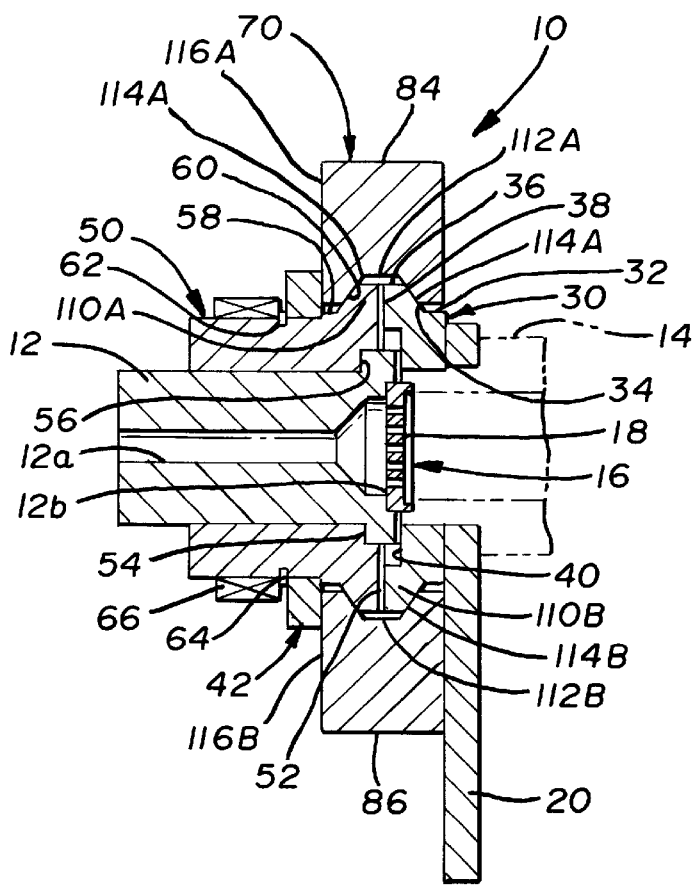
FIG. 1 is a partial cross-sectional view of an extruder head with a flexible locking gate.

Referring first then to FIG. 1 of the drawings, it will be seen that a flexible locking gate, generally indicated by the numeral 10, includes a die 12 which is internally configured to form an extruded part. The die 12 is coupled to an extruder barrel 14 that forces molten polymeric material through an interposed breaker plate 16 which has a plurality of holes 18 therethrough. As is known by the skilled artisan, the die 12 is designed to be an interchangeable part that allows for quick tooling changes when a different part is to be manufactured. It will also be appreciated that the die 12 must be removed to periodically clean the extruder barrel 14 and service the feed screw (not shown) received therein.

Figure 2:
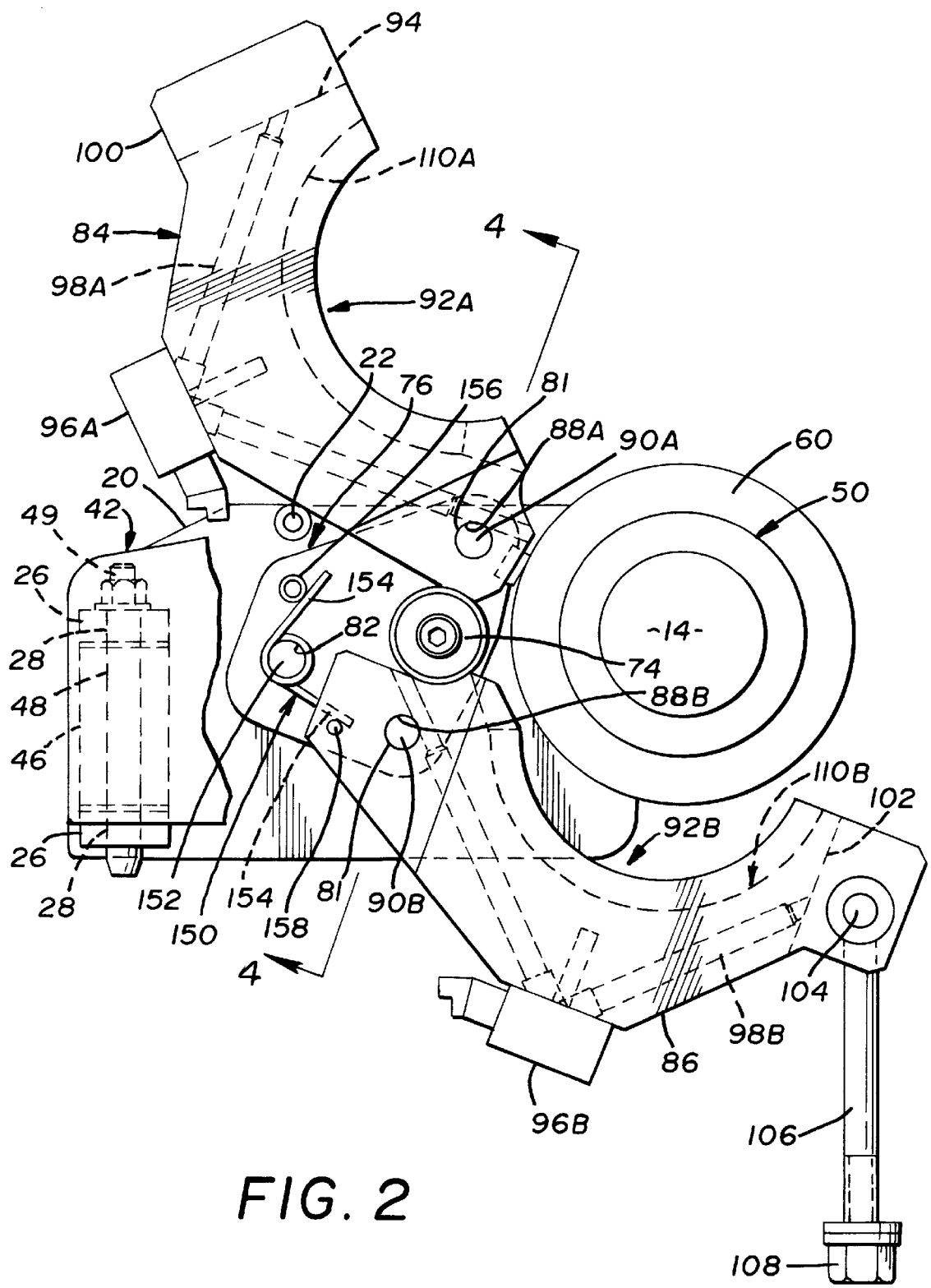
FIG. 2 is a fragmented front view of the flexible locking gate showing a clamp ring in an open position.

Referring now to FIGS. 1 and 2, it can be seen that a clamp support plate 20 is carried by and extends from one end of the extruder barrel 14. A clamp bumper 22 transversely extends from the clamp support plate 20. A pair of opposed arms 26 also extend transversely from the clamp support plate 20. Each arm 26 has a hole 28 aligned with the other extending therethrough.

Carried by the end of the extruder barrel 14 is a barrel flange 30 which clamps support plate 20 to the end of barrel 14. Typically, the barrel flange 30 has internal threads that are matingly received by the end of the extruder barrel 14. Alternatively, threaded fasteners may be used to secure the barrel flange 30 to the facing clamp support plate 20. The barrel flange 30 includes an outer rim 32 from which extends an angular cam surface 34. A flange collar 36 faces the angular cam surface 34 and terminates at a substantially perpendicularly extending flange face 38 which forms a clearance surface opposite face 52 of adapter 50. The die 12, which has a through bore 12a which has a sealing face 12b which seals against a surface or breaker plate 16, is received within a recess 40 provided by the flange sealing face 38.

A die support 42, which is only partially shown in FIG. 2, is pivotally received between the arms 26. A hinge 46 transversely extends from the die support 42 and has a bore 48 therethrough aligned with the holes 28. A threaded swing pin 49 is received through the holes 28 and bore 48 to allow pivotable movement of the die support 42.

A die adapter 50 is carried by the die support 42 which in turn carries the die 12. Accordingly, the die 12 is movable to a position aligned with and facing the extruder barrel 14 by pivotally moving the die support 42. The die adapter 50 includes an adapter sealing face 52 which faces the flange sealing face 38. A recess 54 is provided in the adapter sealing face 52 to receive a head 56 of the die 12. An adapter collar 58 is provided on the outer surface of the adapter 50. An angular cam surface 60 extends between the adapter collar 58 and the adapter sealing face 52. A notch 62 is provided in the adapter collar 58 for receiving a retaining ring 64 which holds the die support 42 to the die adapter 50. A heater band 66 may be provided around the die adapter 50 to facilitate the extrusion process.

Figure 3:
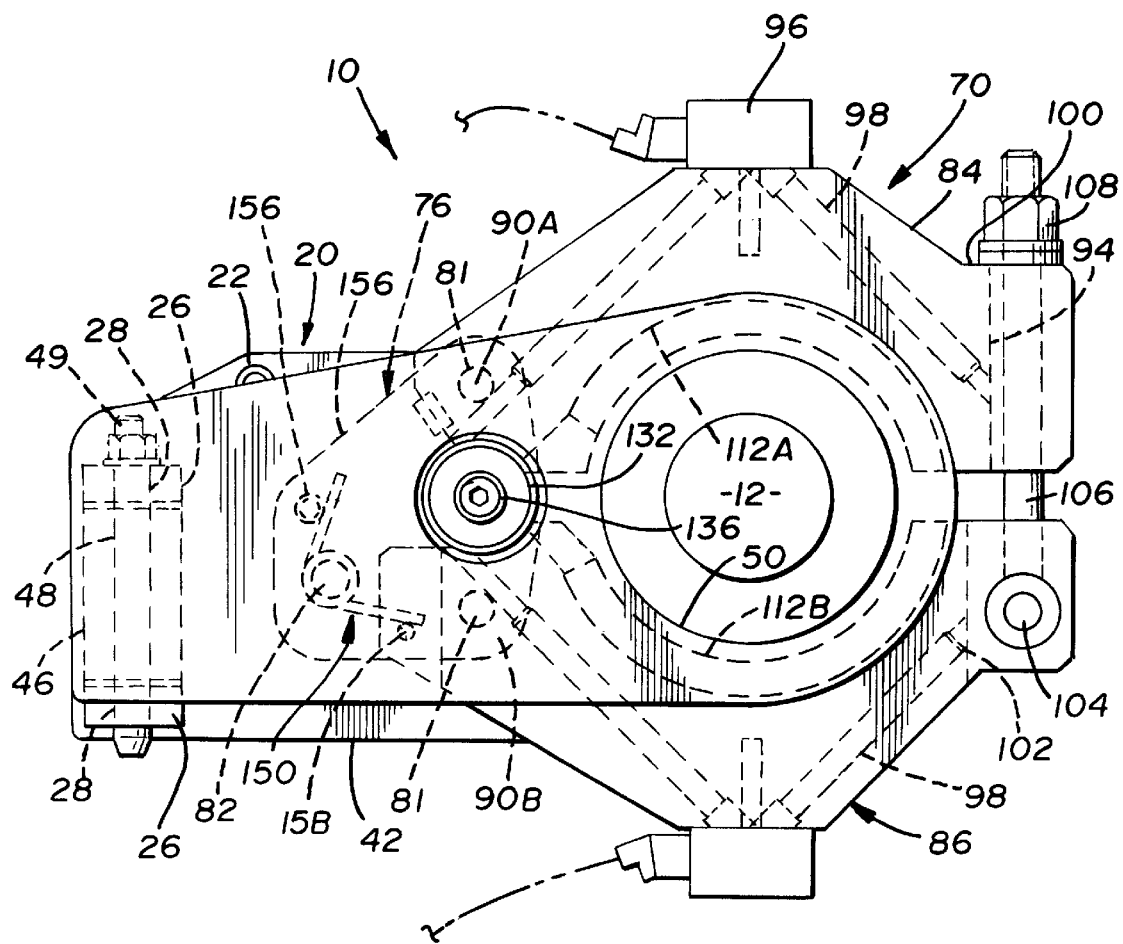
FIG. 3 is a front view of the flexible locking gate showing the clamping ring in a closed position.

Referring now to FIGS. 1–3, it can be seen that a clamp ring 70 is aligned with and surrounds the barrel flange 30 and the die adapter 50. In particular, it can be seen in FIG. 2 that the clamp ring 70 is shown in an opened position which allows the die support 42 to be pivotally moved into and out of position. FIG. 3 shows the clamp ring 70 in a closed position that bears upon the angular cam surfaces 34 and 60.

Figure 4:
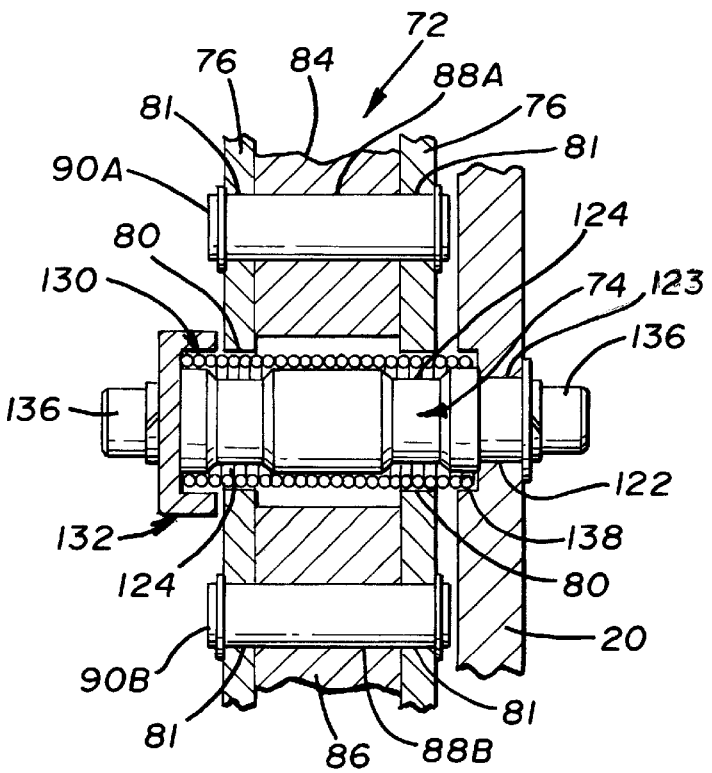
FIG. 4 is a partial cross-sectional view taken along lines 4—4 of FIG. 2.

Referring now to FIG. 4, it can be seen that a link mechanism, which is generally indicated by the numeral 72, carries components of the clamp ring 70. The link mechanism 72 includes a spring pin 74 which is cantilevered from the clamp support plate 20. A pair of opposed gate links 76 are carried by the spring pin 74. Each gate link 76 provides a spring pin hole 80 through which is received the spring pin 74 such that the gate links 76 are at least partially rotatable. The gate links 76 also provide a pair of holes 81, which are diametrically opposed to one another, and a torsion pin hole 82. The link mechanism 72 carries a top clamshell 84 and a bottom clamshell 86, both of which are closable upon the die adapter 50 and the barrel flange 30. In instances where the top clamshell 84 and the bottom clamshell 86 have like structural elements, those structural elements will be identified by capital letter designations A and B. For example, the clamshells 84 and 86 each have link holes 88 that are aligned with the gate link holes 81. Therefore, the top clamshell 84 has a link hole 88A and the bottom clamshell 86 has a link hole 88B. Gate link pins 90A and 90B pivotally secure the gate links 76 to the clamshells 84 and 86, respectively, through the holes 81 and the link holes 88A and 88B.

Referring back to FIGS. 2 and 3, each clamshell 84 and 86 provides a semi-circular opening 92A and 92B which fit around the circularly-constructed barrel flange 30 and die adapter 50. The top clamshell 84 provides a bolt channel 94 at an end opposite the link mechanism 72. Also provided on both clamshells are heater boxes 96A and 96B which are respectively connected to heater cartridges 98A and 98B that are internally received within the respective clamshells. The top clamshell 84 also provides a locking flat 100 adjacent the bolt channel 94.

The bottom clamshell 86 provides a bolt channel 102 through which transversely extends a pivot pin 104 for pivotally carrying a lock bolt 106. =.A hex nut 108 is disposed at the end of the lock bolt 106 opposite the pivot pin 104. As best seen in FIG. 3, when the clamp ring 70 is closed, the lock bolt 106 is pivoted to fit within the bolt channel 94 and the hex nut 108 is tightened against the locking flat 100.

The clamshells 84 and 86 each provide a lock channel 110A and 110B which include an inner ring 112A and 112B with opposed, angled cam surfaces 114A and 114B. It will also be appreciated that an outer face 116A and 116B is provided by the clamshells which slidably bears against the inside surface of the die support 42 when the clamp ring 70 is closed.

And the angled cam surfaces 114A and 114B both bear against the angular cam surface 34 and the angular cam surface 60.

Referring again to FIG. 4, it can be seen that the spring pin 74 includes a stub 122 that is fixably received into a hole 123 of the clamp support 20. Further, the spring pin 74 is provided with a pair of radial grooves 124 that are positionally aligned with each gate link spring pin hole 80. A helical spring 130 is slidably received over the spring pin 74 such that it is rotatable around the spring pin 74. The helical spring 130 is typically a steel spring that is cut to length. Those skilled in the art will also appreciate that different types of springs may be associated with the spring pin 74. For example, a helical spring could be wound around the grooves 124 or, alternatively, leaf springs could be disposed between the grooves 124 and the gate links 76 at the spring pin hole 80.

A cap 132 is disposed over the end of the spring pin 74 opposite the stub 122. The cap 132 functions to capture both the spring pin 74 and the spring 130 to the clamp support 20 while allowing rotatable movement of the gate links 76. Threaded socket head cup screws 136 are inserted into each end of the spring pin 74 to complete the assembly of the link mechanism 72 to the clamp support plate 20. A recess 138 may be provided in the clamp support plate 20 to receive and support a portion of the spring pin 74 and an end of the spring 130.

From all of the figures, it will be appreciated that as the top clamshell 84 and the bottom clamshell 86 are closed upon the barrel flange 30 and the die adapter 50, the angled cam surfaces 114A and 114B bear against and seal around the angular cam surface 34 and the angular cam surface 60. As this occurs, the flange and adapter are placed in a tight sealing relationship with the breaker plate 16 as previously described. Tight dimensional tolerances are required in order to ensure an optimum seal between the barrel flange 30 and the die adapter 50. Slight dimensional variations of the barrel flange 30 and the die adapter 50 are compensated for by virtue of the gate links 76 being allowed to float on or be biased by the spring pin 74. In particular, the clamshells 84 and 86 are allowed to "float" with respect to one another and with respect to the barrel flange 30 and the die adapter 50 as the hex nut 108 is tightened upon the locking flat 100. Biasing of the gate links 76 allows side-to-side movement and also slight lateral movement of the clamshells 84 and 86 with respect to the barrel flange 30 and the die adapter 50.

Another feature of the present invention is the inclusion of a torsion spring 150 in the link mechanism 72. Particularly, a torsion pin 152 extends between the holes 82 of each respective gate link 76 and slidably receives a helical portion of the torsion spring 150,. An opposed end 154 of the spring 150 is captured by a cap screw 156 that is secured to one of the gate links 76, while the other opposed end 154 of the spring 150 is biased by a dowel pin 158 that extends from the bottom clamshell 86. Accordingly, the torsion spring 150 is coupled between the opposed gate links 76 and the bottom clamshell 86 so that it is counterbalanced. In other words, when the lock bolt 106 is released from the locking flat 100, the weight of the bottom clamshell 86 is biasingly supported to prevent damage thereto. This also reduces the possibility of an operator inadvertently injuring their hands as the clamp ring 70 is opened. It will also be appreciated that the top clamshell 84 is supported by the clamp bumper 22 when in the opened position.

It is apparent then from the above description of the structure and operation of use of the flexible locking gate 10 that the problems associated with previous locking gates have been overcome. In particular, the flexible locking gate 10 provides an evenly distributed and uniform sealing force around the barrel flange 30 and the die adapter 50. This feature is advantageous in that a tight seal is maintained between the die and the extruder barrel such that the extrusion material does not leak therefrom. This overcomes the problems of the prior locking gates which may not provide a uniform sealing force.

Another advantage of the flexible locking gate 10 is that a torsional spring is provided between the link mechanism and the bottom clamshell so as to preclude damage to the clamshell or the user of the flexible locking gate when replacing dies within the die adapter.

While a full and complete description of the invention has been set forth in accordance with the dictates of the patent statutes, it should be that modifications can be resorted to without departing from the spirit thereof or the scope of the appended claims. For example, the invention has been described in the context of an extruder. However, it is believed apparent that the operational structure of the flexible locking gate could be readily adapted to any device in which a tight seal is required between two mating parts.

What is claimed is:

1. Apparatus for locking a die to an extruder barrel, comprises:
   a) a barrel flange carried by an end of the extruder barrel, said barrel flange having a flange sealing face;
   b) a die adapter for carrying the die, said die adapter having an adapter sealing face alignable with said flange sealing face;
   c) a clamp ring having opposed clamshells;
   d) a pin extending from a clamp support proximal said barrel flange;
   e) a spring disposed over said pin;
   f) a link mechanism connected to said clamshells; and
   g) means for biasingly supporting said link mechanism to allow said opposed clamshells to seal uniformly around said barrel flange and said die adapter and bring said flange sealing face into sealing contact with said adapter sealing face, said biasingly supporting including said pin and said spring.

2. The apparatus of claim 1 wherein said link mechanism includes:
   a pair if opposed gate links each having a pin hole at about a mid-point thereof for pivotally receiving said pin, each said gate link having a pair of diametrically opposed gate link holes; and
   a pair of link pins extending respectively through said pair of gate link holes;
   each said opposed clamshell having a link hole for pivotally one of said pair of links pins.

3. The apparatus of claim 2 wherein:
   said pin has a pair of grooves each aligned with respective said gate links.

4. The apparatus of claim 3 further comprising:
   said clamp support carried by the extruder barrel;
   a die support pivotally mounted to said clamp support, said die support carrying said die adapter and said die adapter providing a cam surface;
   said opposed clamshells providing clamshell cam surfaces which bear against at least said die adapter cam surface, wherein said gate links are biased within said pair of grooves to evenly distribute a sealing force applied by said opposed clamshells.

5. The apparatus of claim 4 wherein one of said opposed clamshells provides a bolt channel and a locking flat at an end opposite said gate link, and wherein the other of said opposed clamshells provides a pivotable locking bolt with a moveable locking nut at an end opposite said gate link, said moveable locking nut bearing against said locking flat when said opposed clamshells are closed upon one another.

6. The apparatus of claim 5 wherein said pin transversely extends from said clamp support at one end and wherein a cap is secured to the other end of said pin to hold said link mechanism in place.

7. The apparatus of claim 1 further comprising:
   means for counterbalancing one of said opposed clamshells with respect to said link mechanism.

8. Apparatus for evenly distributing forces around a die mounted to an extruder barrel, comprising:
   a) a barrel flange mounted the extruder barrel, said barrel flange providing a flange sealing face and a first angular cam surface;
   b) a die adapter for carrying the die, said die adapter providing an adapter sealing face that is opposable to said flange sealing face, and a second angular cam surface;
   c) a pair of opposed clamshells each with a semi-circle opening and a lock channel therein facing each other, each said lock channel having angled cam surfaces facing said first and second angular cam surfaces;
   d) a locking mechanism at one end of each said pair of opposed clamshells; and
   e) a biased link mechanism at the other end said pair of opposed clamshells, whereby said locking mechanism applies a closure force to at least engage said angled cam surfaces against said first and second angular cam surfaces, and said biased link mechanism biasingly permits said cam surfaces to bring said sealing faces into uniform sealing contact; wherein said biased link mechanism comprises:
   a spring pin having a pair of grooves;
   means for biasing associated with said pair of grooves; and
   a pair of opposed gate links each having a spring pin hole for receiving said spring pin, said biasing means biasingly supporting said pair of opposed gate links, said pair of opposed gate links pivotally connecting said pair of opposed clamshells.

9. The apparatus according to claim 8, wherein said pair of opposed gate links each have a pair of gate link holes, and wherein each said clamshell has a link hole aligned with respective gate link holes and wherein a gate link pin is received through said clamshell link hole and said respective gate holes.

10. The apparatus according to claim 9, wherein said means for biasing is a helical spring axially disposed over said spring pin and interposed at least between said pair of grooves and said gate links.

11. The apparatus according to claim 10, further comprising:
   a clamp support carried by the extruder barrel, said spring pin axially extending from said clamp support.

12. The apparatus according to claim 11, further comprising:
   a counter-balance spring interposed between one of said clamshells and said link mechanism.

* * * * *

UNITED STATES PATENT AND TRADEMARK OFFICE
CERTIFICATE OF CORRECTION

PATENT NO. : 5,888,557
DATED : March 30, 1999
INVENTOR(S) : Kurt G. Houk

It is certified that error appears in the above-identified patent and that said Letters Patent is hereby corrected as shown below:

Column 5, line 33 (line 2 of Claim 1), delete "comprises" and substitute therefor —comprising—;

Column 5, line 48 (line 17 of Claim 1), insert the word —means— after the word "supporting";

Column 5, line 52 (line 3 of Claim 2), delete "if" and substitute therefor —of—;

Column 5, line 59 (line 10 of Claim 2), insert the word —receiving— after the word "pivotally";

UNITED STATES PATENT AND TRADEMARK OFFICE
CERTIFICATE OF CORRECTION

PATENT NO. : 5,888,557
DATED : March 30, 1999
INVENTOR(S) : Kurt G. Houk

It is certified that error appears in the above-identified patent and that said Letters Patent is hereby corrected as shown below:

Column 5, line 59 (line 10 of Claim 2), delete "links" and substitute therefor —link—;

Column 6, line 20 (line 3 of Claim 8), insert the word —around— after the word "mounted";

Column 6, line 33 (line 16 of Claim 8), insert the words —of each— after the word "end";

Column 6, line 54 (line 6 of Claim 9), insert the word —link— after the word "gate."

Signed and Sealed this

Thirteenth Day of July, 1999

Attest:

Q. TODD DICKINSON

Attesting Officer

Acting Commissioner of Patents and Trademarks